Aug. 23, 1932.   F. S. CARR   1,873,869
FASTENING INSTALLATION
Filed March 31, 1927

Inventor:
Fred S. Carr

Patented Aug. 23, 1932

1,873,869

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENING INSTALLATION

Application filed March 31, 1927. Serial No. 179,939.

This invention aims to provide improvements in fastening installations, and more particularly to installations in which the fastening means includes nut and screw elements.

In the drawing, which illustrates preferred embodiments of my invention:—

Figure 2:
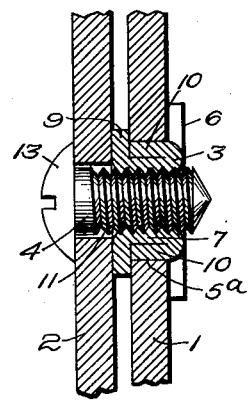
Fig. 2 is a section on the line 2—2 of Fig. 1, with the part to be secured to the frame in position and the screw also being in position to hold the parts together.
Figure 3:
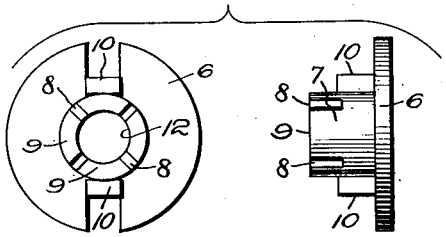
Figure 4:
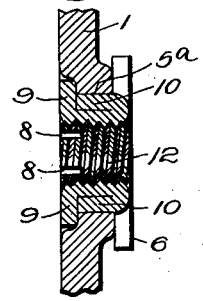
Figure 5:
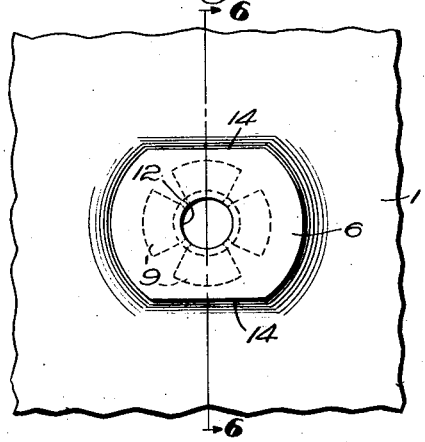
Figure 6:
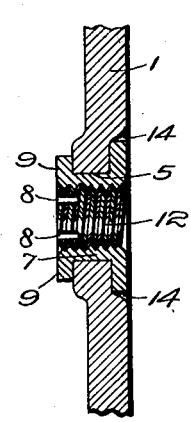

Fig. 3 includes a front and side elevation of the nut before assembly to the frame;

Fig. 4 is a section through a frame part provided with a depressed portion surrounding the aperture in the frame, a nut similar to that shown in Fig. 2 being shown in position upon the frame;

Fig. 5 shows another method of attaching the nut to the frame by providing the depression at the inner face and forming the base of the nut to fit the depression; and Fig. 6 is a section on the line 6—6 of Fig. 5.

Referring to the embodiment of the invention, as illustrated in the drawing, I have shown a fastening installation which includes a frame part 1, a part 2 to be secured thereto and a nut 3 and screw 4 for securing the parts together.

Figure 1:
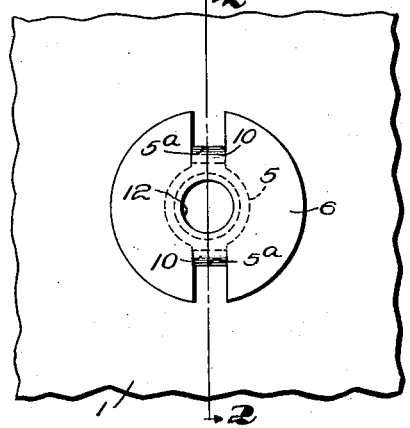
Figure 1 is an elevation of a portion of the frame part of the installation, as viewed from the inner face thereof showing the nut element in position.

The frame part 1, illustrated in Figs. 1 and 2, is provided with an aperture 5 having opposed notches 5ª as shown in Fig. 1.

The nut, shown in Figs. 1 through 4, is pressed from a single piece of metal and is provided with a base 6 from which is pressed a tubular portion 7 adapted to be internally threaded, as shown in Fig. 4. Slits 8 are formed in a portion of the tubular portion 7, adjacent to the free end, to provide easily bendable prongs 9, and means in the form of lugs 10—10 are pressed from the base 6 and disposed along the sides of the tubular portion for reasons more fully hereinafter described.

The part 2 has an aperture 11 therethrough to permit passage of the threaded shank of the screw 4, as shown in Fig. 2.

When assembling the parts of the installation, the tubular portion 7 and lugs 10—10 of the nut are entered into the notched aperture 5 from the back of the frame 1, so that the base 6 may rest directly against the inner face of the frame, as shown in Figs. 1 and 2. Then suitable tools are used to upset the easily bendable prongs 9 against the outer face of the frame 1, as shown in Fig. 2. When thus attached the nut can not be readily loosened and the lugs 10—10 cooperate with the walls of the notches 5ª to prevent accidental turning of the nut relative to the frame. The part 2 may then be placed in position relative to the frame 1, so that the aperture 11 is in substantial alignment with the threaded bore 12 of the nut. By entering and turning the screw, the threads thereof will engage the threads of the bore 12 and the head 13 of the screw will bear against the outer face of the part 2 and draw it tightly against the outwardly bent prongs 9, as indicated in Fig. 2.

Fig. 4 shows the metal around the aperture 5 in the frame 1 depressed slightly so that the prongs 9, when clenched, may be countersunk to permit the part 2 to lie flush against the outer face of the frame.

In Figs. 5 and 6 I have shown the metal around the aperture 5 depressed from the inner side and the recess provided with straight wall portions 14. In this instance the lugs 10—10 are eliminated and the contour of the outer periphery of the base 6 of the nut 3 is made to fit the contour of the wall of the depression in the frame 1 as shown in Fig. 5 to prevent the relative turning between the nut and frame. Aside from this, the installation is the same as described in connection with Figs. 1 through 3.

The fastening means shown and described has many uses and is particularly adapted for use when securing parts to relatively thin metal frames, supports, etc., where the threading of the metal would not be sufficiently durable to retain the screw. This is especially true when any considerable stresses are exerted between the parts secured together.

The nut illustrated and described eliminates this trouble by providing the tubular portion of substantial length provided with sufficient thread to securely engage the threads of the screw 4. Such an installation is strong and durable and capable of withstanding substantial stresses.

I do not wish to be limited to the particular embodiments of my invention, illustrated and described, my invention being best described in the following claims.

1. A nut having a base, a threaded boss of smaller diameter extending from said base and a locking lug formed from the material of said base and extending therefrom along and close to the side of said boss to provide means for locking the nut against accidental rotation when attached to a nut-carrying structure.

2. A fastener device pressed from a single piece of sheet metal and comprising a base portion 6 and tubular portion 7 extending from said base portion 6 and having its outer end portion divided by slits 8 to provide easily bendable prongs for securing said fastening element to a support, the remaining portion of said tubular portion being threaded to receive a cooperating screw and lugs 10 pressed from the said base portion independently of said tubular portion and extending parallel to and along the side of said tubular portion 7 for engagement with a support to lock the nut against accidental rotation.

3. A nut installation comprising, in combination, a supporting structure having an aperture therein, a sheet metal nut secured to said supporting structure and having a base portion bearing against one face of the supporting structure, a tubular portion extending from said base portion into the aperture in said supporting structure and having its outer end portion bent outwardly against the other face of said supporting structure to cooperate with said base portion to secure the nut in position, said tubular portion being internally threaded to receive a cooperating screw, and a lug pressed from said base portion independently of said tubular portion and extending parallel to and along the side of said tubular portion through a notch in said supporting structure to lock the nut against accidental rotation.

In testimony whereof, I have signed my name to this specification.

FRED S. CARR.